INVENTOR.
HENRY J. WIEBE.

Feb. 26, 1963 H. J. WIEBE 3,078,942
TWIN-DRIVE GROUND MOVER AND RETRIEVER
VEHICLE FOR AIRPLANES
Filed May 9, 1960 11 Sheets-Sheet 7

INVENTOR.
HENRY J. WIEBE.
BY
ATTORNEY.

INVENTOR.
HENRY J. WIEBE
BY
ATTORNEY.

Fig. 25

INVENTOR.
HENRY J. WIEBE.
BY
ATTORNEY.

Fig. 26.

INVENTOR.
HENRY J. WIEBE.

3,078,942
TWIN-DRIVE GROUND MOVER AND RETRIEVER
VEHICLE FOR AIRPLANES
Henry J. Wiebe, Cincinnati, Ohio, assignor to General
Aeromation, Inc., Cincinnati, Ohio, a corporation of
Ohio
Filed May 9, 1960, Ser. No. 27,794
6 Claims. (Cl. 180—14)

This invention relates first, to a relatively light-weight twin-drive vehicle for moving airplanes while not in flight particularly airplanes with tricycle type landing gears, without the use of the airplane's turbine engines, or other motive or towing power sources. Secondly, this invention relates to a vehicle also capable for use in retrieving an airplane when it has run off its runway, such as when, upon landing, the airplane's kinetic energy in the landing roll exceeds its braking capacity within the limits of its remaining runway, or within the limits of the capacity of the runway to absorb braking forces on its surface, such as, when it is wet, iced or glazed over, thereby forcing skid or over-run into unimproved terrain.

Relative to the first part, the movement of multi-engined airplanes on the ground, particularly jet-engine propelled airplanes, has become a real and vexing problem, in that the use of jet-engines on the ground is not only very expensive, but incurs many problems due to the great blast noises at disturbingly high frequencies, and the violent air disturbances caused by the jet engines. Because the propulsive efficiencies of jet engines are extremely low at ground movement speeds, further, because the overall gross weights of modern long range jet aircraft has increased enormously in the past decade, thereby greatly increasing the rolling resistance of the heavily loaded tires, the jet engines must run as high as eighty percent full-open throttle-setting to start the taxi roll, thereby consuming very large quantities of jet fuel and producing fumes, smoke and tremendous noise.

On tricycle-type landing gear aircraft, many solutions for the ground movement of such aircraft have been proposed. Such proposals fall in two categories: Towing the heavy airplane from the nose gear with a towing bar hitched to a very large and powerful tractor, but due to the fact that the nose gear is not as strong nor as heavily loaded as the main gears, and is a great distance from the center of mass and center of rolling resistance of the airplane, any traction vehicle which is massive enough to develop tractive effort, when attached to a tow bar to the nose gear of the airplane, is separated by a great distance from the true center of resistance-to-rolling, and center of gravity, of the airplane, so that such heavy towing vehicle's effectiveness is greatly reduced, especially when towing, nosing into, backing away, or turning the airplane to, from, near, or into modern passenger terminals, gates, buildings or enplaning ramps. Such massive traction vehicles of the four wheel drive type, sometimes have a tendency to "rock" or "hump" the tractor's great weight alternately from rear to front drive wheels and back again, greatly reducing the tractor's pulling power, under heavy towing operations. Such massive traction vehicles with tow-bars are much too slow and cumbersome in executing a move or taxi, especially when the plane has been committed to service and the unnecessary time consumed reduces the plane's productive to non-productive ratio or utility rate, thereby effectively reducing the jet airplanes' earning power. When snow and ice covers airport surfaces such massive towing vehicles hitched by tow-bar to jet airplane's nose gear, are often very ineffective or unable to move, back, or turn such heavily loaded jet airplane, causing unnecessary delay in plane arrival or departure, and added costs.

The second group of proposed solutions to moving heavy tricycle landing gear type aircraft on the ground falls into the category of propelling the main landing gears of the airplane by attaching to their wheels some device that will transfer torque to such wheels, so that these main landing gear wheels are made to act as tractor drive-wheels, thereby propelling the airplane. This has been called the wheel-mover principle. All of these methods have proved impractical, inasmuch as most of them which are the more effective require modifications which must be made upon the wheels; such modifications either weaken the wheel and thereby shorten its life, or when designed originally to take care of such modification, such wheels weigh more thereby adding dead weight to the airplane, both of which are engineering considerations of grave consequences in aircraft design.

Another type of device which has proved impractical in the wheel-mover category is called the friction-drive which has driving-rollers pressed with great force against the periphery of the main landing gear tires, thereby imparting torque to such wheels and propelling the airplane. They have proved impractical for many reasons, inasmuch as insufficient torque is available to the wheels through this medium under many conditions. The great pressure which must be placed upon the drive-rollers causes the tire to suffer internal breakage of its cords, rendering it unsafe for sustaining high rolling loads at take-off gross weights and at impact and during the deceleration upon landing when large braking forces must be absorbed by the main landing gear tires. Wet runways or taxiways further reduce friction between drive-rollers as do grease or other foreign matter preventing proper torque transmission from drive-rollers to the main landing gear tires.

This invention also relates to the retrieving of heavy tricycle landing gear type aircraft which have over-run the end of the runway into unimproved terrain. Many proposals and methods of retrieving such an airplane have been tried over the past fifteen years, most of which have been very difficult or generally unsuccessful. Two problems are involved, the first is to raise the heavy aircraft up out of the soil into which it has settled, and the second is to move the airplane to its runway after it has been lifted. Very large inflatable bags have been proposed and tried which are placed under the wings of the disabled airplane and inflated thereby lifting the airplane out of the soil. However, this has proved impractical inasmuch as the inflated bag is extremely unstable and readily permits the suspended wings of the airplane resting upon it to roll off to one side or the other in much the same way as a person's body tends to roll off a fully inflated air pillow. Upon lifting, there is no practical method available to move the airplane upon such inflated bag. Most attempts to use this method have been disappointing and unsuccessful.

This invention provides a vehicle capable, when used in consort with others of light design, to lift an entire airplane up and out of the soil or unimproved terrain and to move it back to the hard surface runway upon heavy timber cribbing which supports the loads imposed upon the vehicle wheels from the disabled airplane. In the event that the disabled airplane's main landing gears are structurally unsound or destroyed when rolled into such unimproved terrain, accessory truss members may be used to impose the airplane's weight onto the vehicles described herein.

My improved vehicle overcomes the deficiencies of the aforesaid devices for the movement of airplanes and is designed to move under the fuselage and wings of a tricycle landing gear type airplane and be readily attached to the main landing gears of the airplane very near its center of gravity and center of rolling resistance, employing a single operator to perform all the operations of positioning the vehicle, attaching to the airplane and maneuvering the airplane in any direction either forward, rearward, turning it around on its own center on a zero turning radius, moving it regardless of the condition of the terrain on which it rests, and taxiing the airplane safely at maximum allowable taxi speeds.

The object of my invention is to provide a vehicle of relative light weight design capable of moving and making highly mobile an airplane on the ground and having means for attaching the vehicle to an airplane at its main landing gears, transferring part of the airplane's weight to the vehicle to induce traction, and by means of the power of the vehicle and without the aid of any of the airplane's systems or components maneuvering the airplane in any and all directions.

A further object of my innvention is to provide a means of moving a tricycle landing gear type airplane by applying the moving forces to the main landing gears of such airplane at or near the true center of rolling resistance and center of mass of the airplane, thereby greatly increasing the effectiveness of vehicle's moving forces applied to such airplane.

A further object is to reduce to zero the turning radius of a tricycle type landing gear airplane and simultaneously reducing, as a consequence its terminal parking space and clearance to adjacent aircraft and to terminal structure requirements, by applying a rearward towing force to one of the main landing gears while, at the same time, applying to the opposite main landing gear a forward towing force, so that the entire airplane, with a castering nose gear, turns around a point lying on the fore and aft centerline of the airplane, thereby greatly reducing the airplane's required at-ramp turn-around space and reducing airport enplaning space requirements.

A further object is to reduce taxi-time of commercial jet aircraft thereby increasing such plane's productivity and earning power.

A further object is to eliminate the smoke, fumes, particles of dust, jet blast, and the extreme noise associated with jets when taxied at or near airport terminal buildings, gates, and passenger enplaning points.

A further object is to provide a vehicle that is capable of taxiing an airplane safely at any allowable taxi speed.

A further object is to improve maneuverability and mobility of all jet powered tricycle-type aircraft.

A further objective is to provide a vehicle, even though it is too wide when in the airplane taxiing configuration, which can be readily driven along any narrow driveway or taxi-way or returned to the airport terminal area from the take-off point, "upstream," even though jet airplanes are using the same taxi-way at the very same time, by driving the vehicle under the extended wingspan of the airplanes in a relatively narrow configuration, thereby eliminating need for additional vehicle driveways for returning vehicles to terminal after taxiing airplane out to take-off area.

A further objective is to provide a vehicle that, when equipped with centrally operated remote controls, can be automatically operated from a route-and-taxi-control-center in a more automatic and programmed traffic and ground control procedures, permitting faster, simpler, and more efficient traffic flow, assured separation distances with other aircraft, taxi route control, and increased capacities of air terminal facilities and reduced ground delays.

A further object is to provide a vehicle that is attachable on all tricycle landing gear type airplanes without requiring any modification or design changes to such airplanes.

A further object is to provide a vehicle that will attach and operate, as mover and taxi vehicle, at either the forward or rearward side of the main landing gears of tricycle landing gear type airplanes.

A further object is to provide a vehicle when attached to an airplane, the dimensions of which in the plan view are entirely within the plan view outline of the airplane, in contrast with present traction vehicles used whose position is extended ahead of the airplane, so that the nose of the airplane, with vehicle attached, can be taxied, at right angles, directly up to and near a wall, as is required at some passenger terminal enplaning positions, and on naval aircraft carrier decks and storage positions.

A further object is to provide a central chassis provided with means for attachment to the respective main landing gears of a tricycle type landing gear on an airplane, and a pair of power chassis rotatable in relation to the ends of said central chassis to position said power chassis in end alignment, forward of the attaching means or rearward of the attaching means.

A further object is to provide the two power chassis with dual controls, whereby one operator can control the operation of both power chassis from either chassis.

A further object is to provide means on the respective power chassis for raising and lowering the central chassis in relation to the power chassis for forming a connection with the main landing gears of an airplane.

A further object is to provide each power chassis with a drive wheel and a second wheel which can be connected to a steering mechanism or released from the steering mechanism permitting the wheel to caster.

A further object is to provide a vehicle capable, when used in consort with others of like design, to lift an entire airplane up and out of unimproved terrain and move it back to the hard surface runway from which it overran upon landing.

A further object is to proportion a portion of the weight of the airplane on the vehicle, whereby eighty to ninety-five percent of the weight is imposed on the driving wheels and five to twenty percent on the castering wheels.

It is a further objective of this invention to provide a twin drive vehicle with a left hand or No. 1 engine and a right hand or No. 2 engine to smoothly power or taxi any tricycle type airplane in a manner very similar to the power provided for such purpose by the airplane's left hand and right hand engines, in which such power from such vehicle's twin drives is conveyed through torque converters to the surface of the airport terrain or ship deck smoothly and without shock or jerk in much the same smooth manner as the airplane's engines applies power for such taxi purpose, but with much more efficiency, effectiveness, despite snow and ice, surface conditions, and more versatile mobility and maneuverability.

My invention will be further readily understood from the following description and claims, and from the drawings, in which latter:

My improved twin-drive ground mover and retriever vehicle comprises three interrelated units, consisting of a pair of driving chassis 31 and 32 and a connecting structural chassis 33. Hereinafter chassis 31 will be referred to as the No. 1 chassis and chassis 32 as the No. 2 chassis. Both of these chassis are identical in structure with the exception that the pilot wheel on the chassis No. 1 is steerable by means of a selective steering engaging mechanism. The pilot wheel on the chassis No. 2 is always in free horizontal rotative position. Also the chassis are right and left hand.

Each chassis 31 and 32 comprise a frame 34 on which is a driver's seat 35, a prime mover 36 in the form of a gasoline powered engine having a three speed forward and reverse hydraulic torque converter transmission 37 connected thereto.

The chassis 33 comprises a tubular member 38 having extending end members 39 which are clamped to split sleeves 40 by means of welded lugs on the sleeves 40 and bolts 41 extending through the lugs and the end members 39.

The frame 34 has forward extending legs 43 and 44 on which is secured the main drive wheel housing 45 which consists of a circular base plate 46 and a circular top plate 47 having a sleeve 48 connecting the plates by means of screws 49 and 50. A second sleeve 51 encircles the sleeve 48 having a space 52 between the sleeves. This sleeve 51 is rotatable between the plates 46 and 47, rotating on balls 53 and 54.

Figure 8:
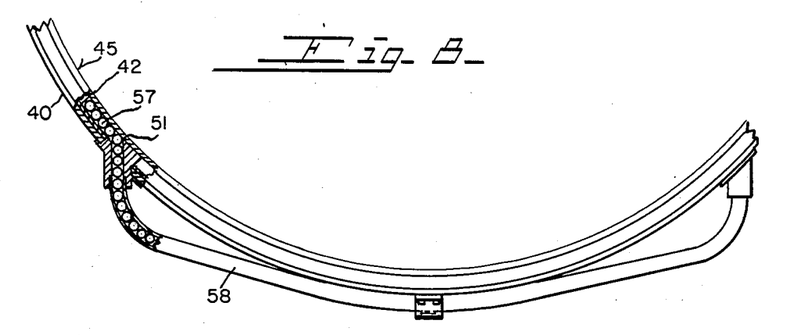
FIG. 8 is a plan view of a detail, partly in section, showing the ball return and feeder tube.
Figure 9:
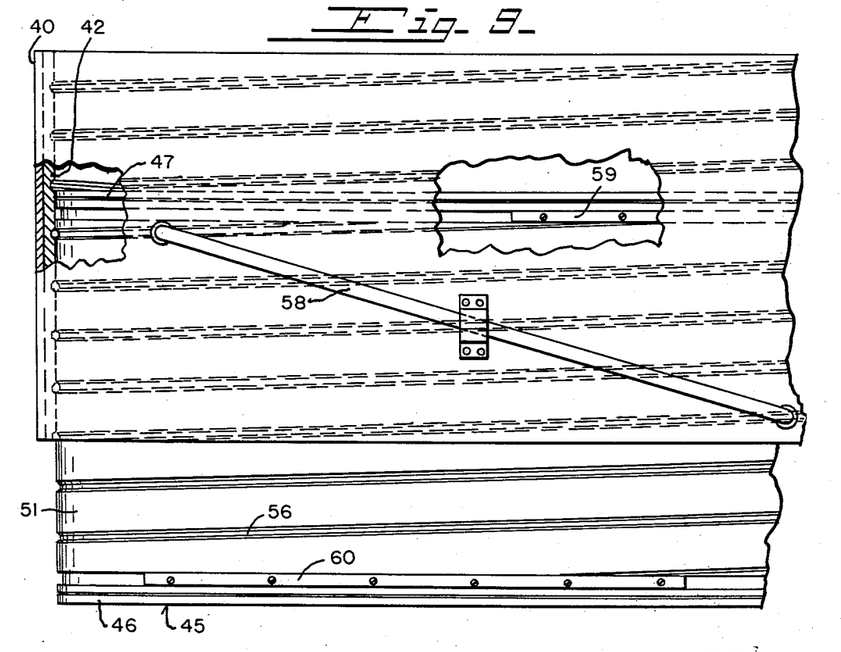
FIG. 9 is a side view of the same, partly broken away.

The split sleeve 40 has a sleeve 42 clamped therein and the sleeves 42 and 51 have co-operating spiral raceways 55 and 56 with balls 57 in the co-operating raceways to form a screw connection between the spiral raceway sleeves 42 and 51. The means for rotating the spiral raceway sleeve 51 will be hereinafter described. As the sleeve 51 is rotated in either direction the balls 57 forming a rolling contact between the sleeves, will be fed from the upper portion of the spiral raceway through a tube 58 to the lower portion of the spiral raceway or reversely depending on the direction of rotation. This tube forms a continuous ball track from the spiral raceway at the upper limit to the lower limit. A limiting stop 59 in the upper portion of spiral raceway 56 and a stop 60 in the lower portion of spiral raceway 56 limits the rotative movement of the sleeve 51. (See FIGS. 8 and 9.)

Mounted within the sleeve 48 (see FIG. 7) is a shaft 61 supported in end plates 62 and 63 and plates 64 and 65. The plates 62 and 63 are bolted to the sleeve 48 and the plates 64 and 65 are bolted to the sleeve 48 and the frame legs 43 and 44. A wheel 66 rotates on the shaft 61 being supported on roller bearings 67 and 68. An inflatable tire 69 is mounted on the wheel 66.

Figure 7:
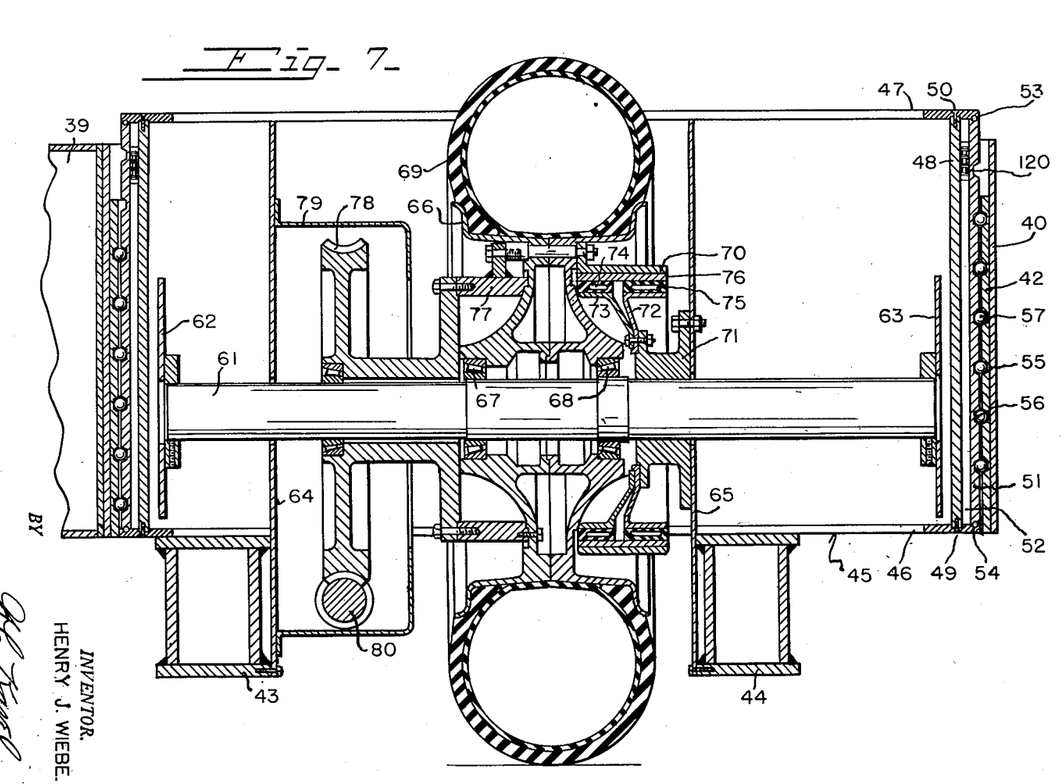
FIG. 7 is a sectional detail of the main driving wheel, taken in the plane of the line 7—7 of FIG. 4.

On one side of the wheel a brake drum 70 is secured to the wheel. A supporting member 71 bolted to the plate 65 supports members 72 and 73 retaining hydraulic expanding members 74 and 75 for applying pressure to a brake shoe 76 when the brake is applied.

Figure 12:
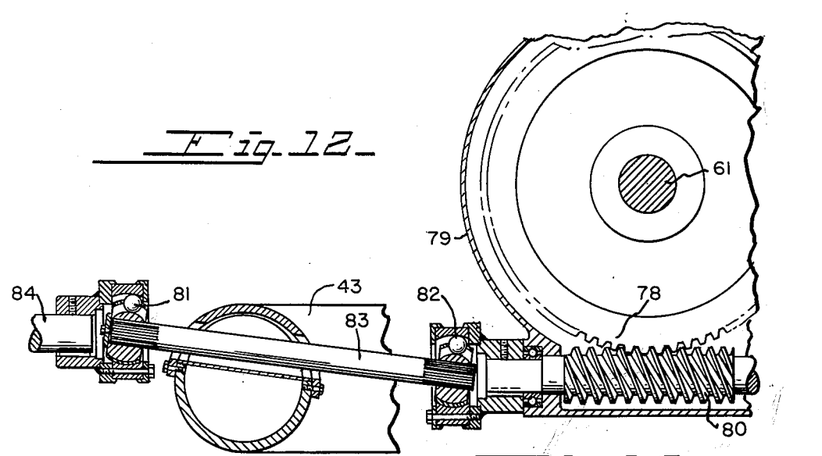
FIG. 12 is a detail section of the worm drive, taken in the plane of the line 12—12 of FIG. 4.

A sleeve 77 is secured to the wheel and supports a worm gear 78 rotatable on the shaft 61. The worm gear 78 is enclosed in a housing 79 and receives its rotation from a worm 80 journalled in the housing. (See FIG. 12.) A pair of universal joints 81 and 82 together with a shaft 83 forms a connection between the transmission shaft 84 and the worm shaft for imparting rotation from the transmission to the wheel 66.

The chassis No. 1 and No. 2 can be arranged endwise to the structural chassis or at right angles to the structural chassis for the vehicle-driving and airplane-taxiing configurations, respectively. Each chassis No. 1 and No. 2 is provided with a pilot wheel 85. A divided sleeve 86 welded to the frame and by means of clamp bolts 87 clamps a sleeve 88 within the sleeve 86. The sleeve 86 rides on balls 89 interposed around the periphery between the sleeve and a base ring plate 90. A top ring plate 91 is spaced from the base plate by an internal sleeve 92 which is secured to the respective plates 90 and 91. A wheel supporting shaft 93 is supported in plates 94, 95, 96 and 97 suitably attached to the sleeve 92. The wheel 85 equipped with an inflatable tire 98 rotates on roller bearings 99 and 100. The pilot wheel on the No. 2 chassis is free to caster at all times and the pilot wheel on No. 1 chassis can be placed in free caster or through the following mechanism placed in steering condition. (See FIGS. 16, 17 and 18.)

Figure 16:
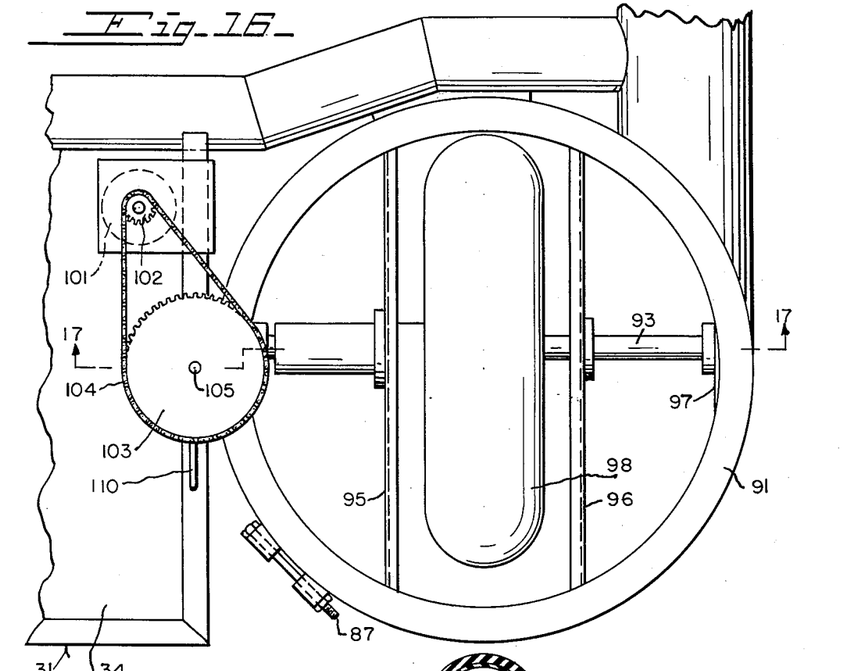
FIG. 16 is a plan view detail of the pilot wheel structure.
Figure 17:
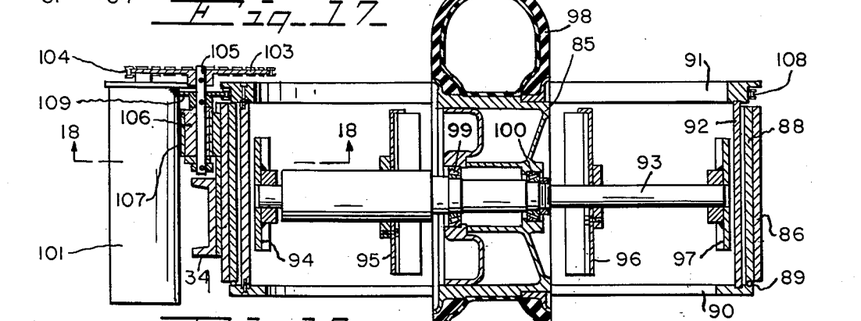
FIG. 17 is a vertical section of the same, taken in the plane of the 17—17 of FIG. 16.
Figure 18:
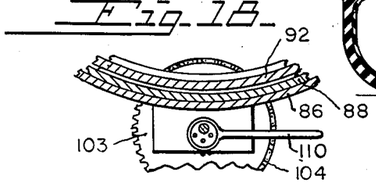
FIG. 18 is a detail section, taken in the plane of the line 18—18 of FIG. 17.

This mechanism which is only on the No. 1 chassis comprises a slow geared electric motor 101 supported on the chassis frame and through a sprocket wheel 102 on the motor shaft drives a sprocket wheel 103 by means of a chain 104. The sprocket wheel 103 is secured to a vertical shaft 105 rotatable in an eccentric bushing 106 journalled in a bearing 107 fixed to the frame. A chain 108 is secured to the outer periphery of the top plate 91 and a sprocket 109 fixed to the shaft 105 engages the chain 108 in one position of the eccentric bushing or when the eccentric bushing is turned 180 degrees by means of the lever 110 attached to the bushing, the sprocket 109, is free of the chain 108 for free castering of the pilot wheel 85.

Figure 1:
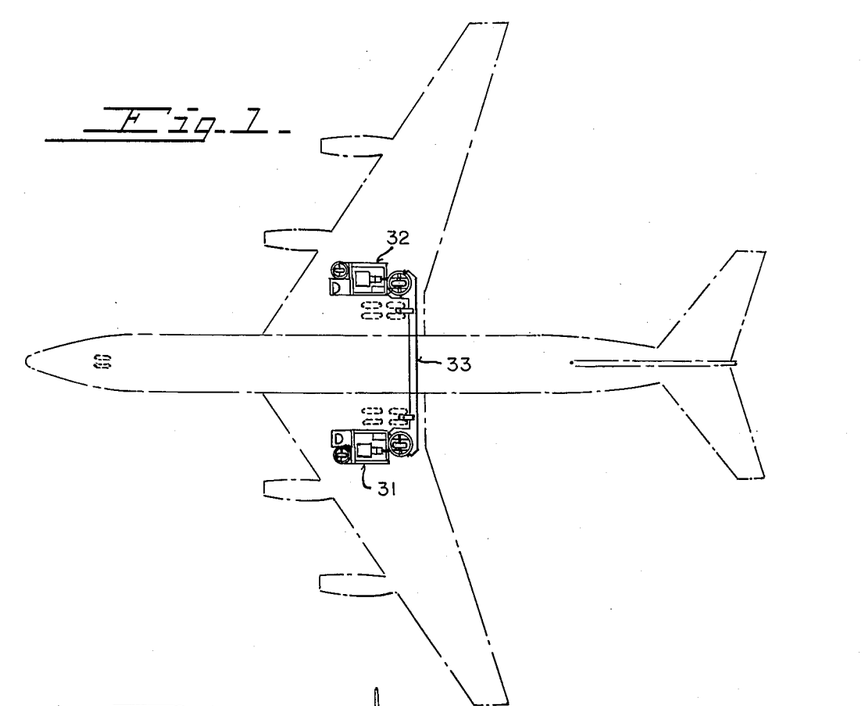
FIG. 1 is a plan view of my improved vehicle in operating position on a jet airplane.
Figure 2:
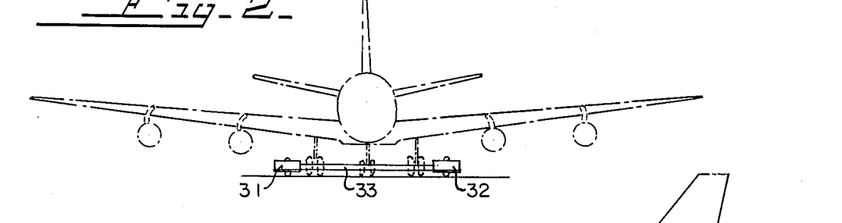
FIG. 2 is a rear view of the same.
Figure 3:
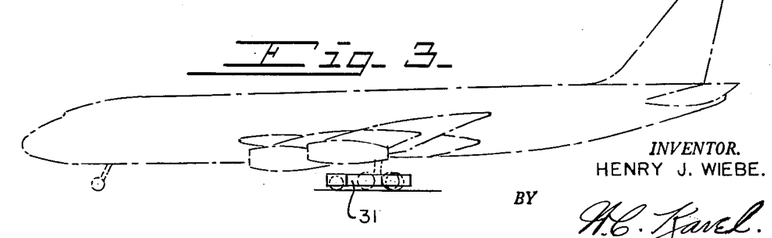
FIG. 3 is a side view of the same.
Figure 4:
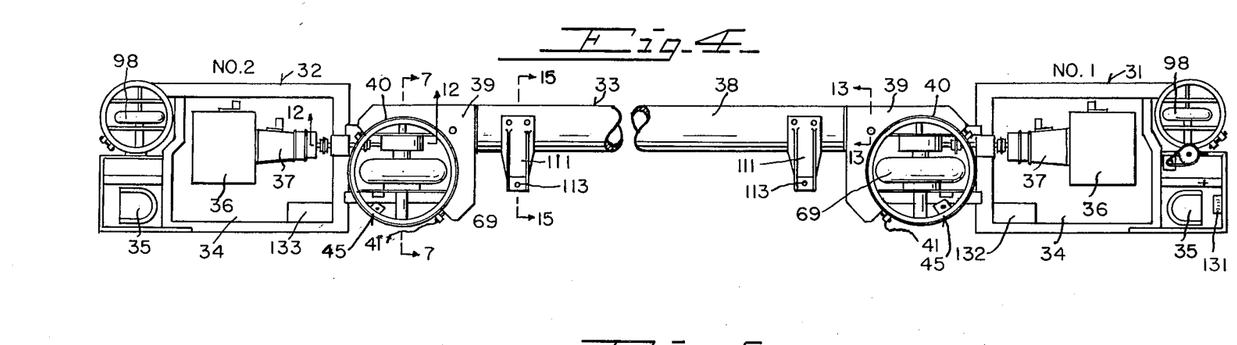
FIG. 4 is a plan view of the vehicle, with the end chassis in alignment for movement of the vehicle, when not attached to an airplane.
Figure 5:
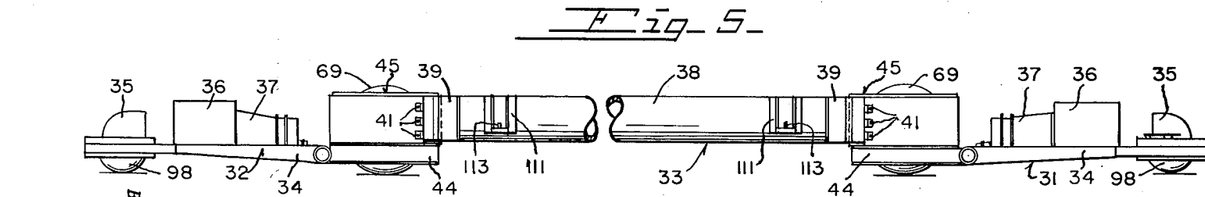
FIG. 5 is a side view of the same.
Figure 14:
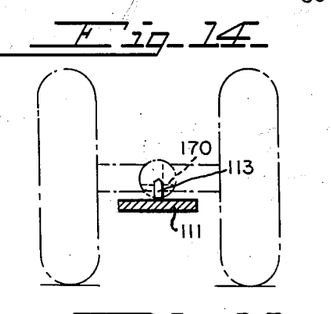
FIG. 14 is a detail section of the weight transfer arm to jack point connection, taken in the plane of the line 14—14 of FIG. 15.
Figure 15:
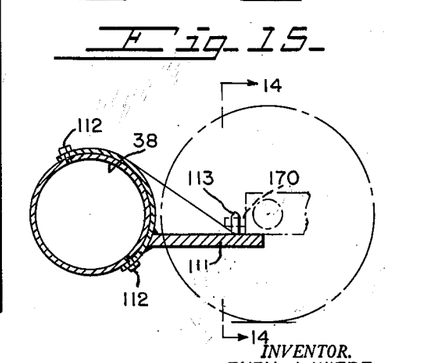
FIG. 15 is a detail section of the weight transfer arm to jack point connection, taken in the plane of the line 15—15 of FIG. 4.

The central structural chassis is provided with spaced extension members 111 bolted to the tubular member 38 by bolts 112 and provided with jack point pin 113. (See FIGS. 4, 14 and 15.)

Figure 10:
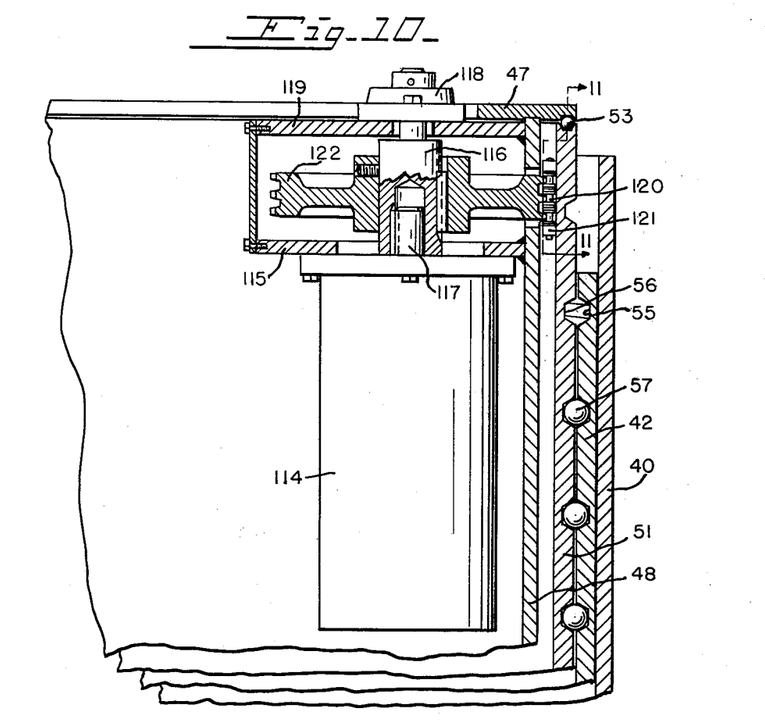
FIG. 10 is vertical detail section of the drive for rotating the intermediate spiral raceway sleeve for raising or lowering the central chassis, taken in the plane of the line 10—10 of FIG. 6.
Figure 11:
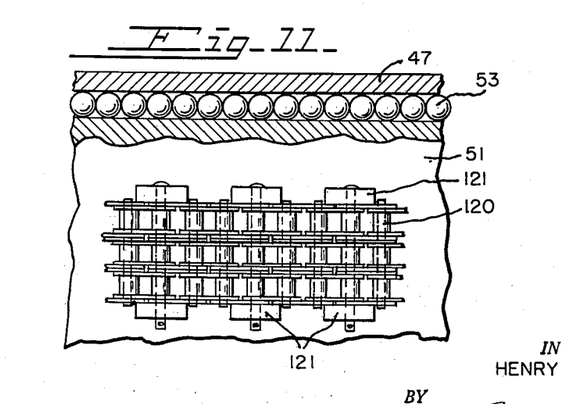
FIG. 11 is a detail section, taken in the plane of the line 11—11 of FIG. 10.

When the vehicle is in position to be attached to the airplane, the central structural chassis which was at its lowermost position is raised by means of a gear head reversible electric motor 114, in each of the chassis No. 1 and No. 2 and are secured to a plate 115 welded to the inner sleeve 48. A shaft 116 is keyed to the motor shaft 117 and is journalled in a bearing 118 secured to an upper plate 119 welded to the sleeve 48. A chain 120 has supporting lugs 121 welded to the sleeve 51 and the chain completely encircles the inner face of the sleeve 51. A sprocket gear 122 keyed to the shaft 116 meshes with the chain for rotating the sleeve 51 in the desired direction to cause the central chassis to raise or lower in respect to the end chassis. (See FIGS. 10 and 11.)

Figure 13:
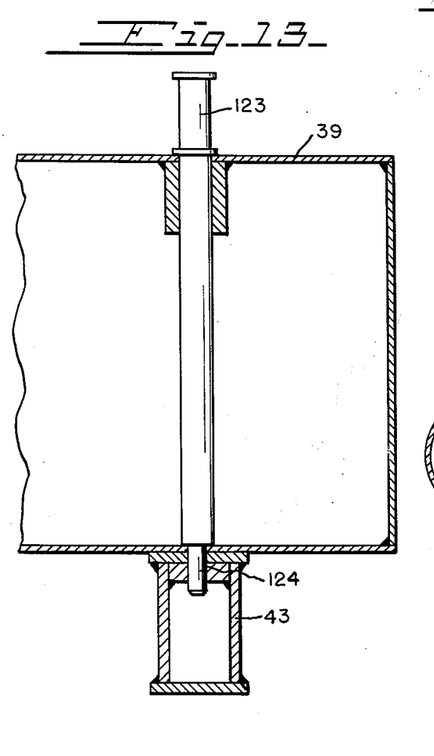
FIG. 13 is a detail section of the holding pin, taken in the plane of the line 13—13 of FIG. 4

The No. 1 and No. 2 chassis are positioned in end to end relation to the central chassis when the vehicle is driven free of the airplane and the operator sitting on the No. 1 chassis can steer the vehicle through the pilot wheel on this chassis. Means are provided for locking the chassis in position relative to the central chassis comprising a pull pin 123 (see FIG. 13) having bearings in the end members 39 and received in an aperture 124 in the leg 44 extending from the frame 34, for end to end positioning and the pull pin 123 engages an aperture 125 in an extension of the leg 43 for holding the chassis at right angles to the central chassis when the vehicle is arranged for attachment to an airplane.

Various means, such as mechanical or hydraulic may be used to steer the vehicle, operate the prime mover and all other functions for operating the vehicle. However, I have shown a remote control electrical arrangement whereby a single operator can from either the No. 1 or No. 2 chassis or on the ground in proximity to the vehicle by means of a master control unit send signals to command receivers on the No. 1 and No. 2 chassis for operating the engines' throttles, brakes, transmission and the raising or lowering of the central chassis.

Figure 19:
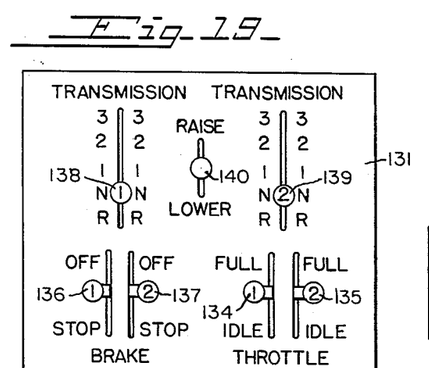
FIG. 19 is a plan view of the transmitter case.
Figure 20:
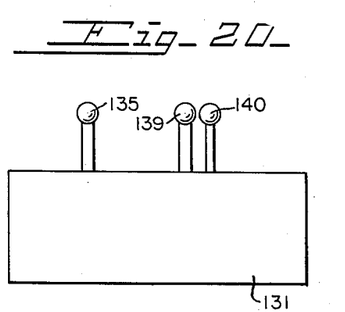
FIG. 20 is a side view of the same.

The master control unit 131 (see FIG. 19) uses a self-contained transmitter, sending signals to each of two receivers 132 and 133 on the No. 1 and No. 2 chassis. The operator controls the two throttles by means of levers 134 and 135, the two brakes by means of levers 136 and 137, the two transmissions by means of levers 138 and 139 and the raising and lowering of the central chassis by means of a lever 140 for changing the signals transmitted by the master control unit and received by the independent command receivers 141 and 142 on the respective No. 1 and No. 2 chassis.

Figure 23:
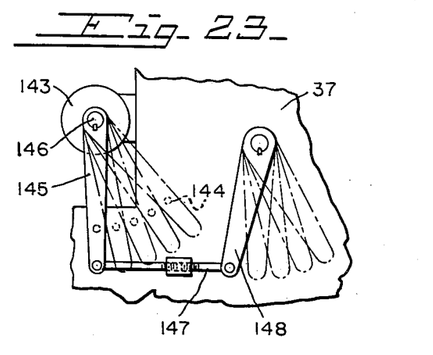
FIG. 23 is a detail view of the gear shifting mechanism.

The transmissions (see FIG. 23) are controlled by the respective levers 138 and 139. A low speed gear reduced high-torque electric motor 143 is mounted on the transmission housing 37 with a five position pick-off switch 144 which is contacted by an arm 145 extending from the motor shaft 146 which advances or returns from neutral to either reverse, first speed, second speed, or third speed. An adjustable push-rod 147 connects the arm 145 to an arm 148 which controls the selective position of the transmission range.

Figure 21:
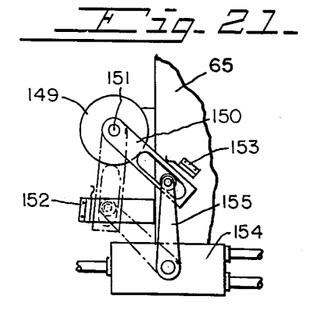
FIG. 21 is a detail view of the brake operating mechanism.
Figure 22:
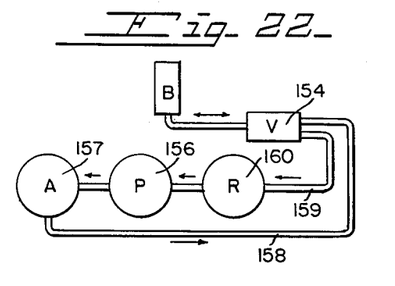
FIG. 22 is a diagrammatic view of the hydraulic system for operating the brake.

The control of the brakes is shown in FIGS. 21 and 22. A low speed, gear reduced high-torque electric motor 149 is mounted on the plate 65 and has a lever 150 fixed to the motor shaft 151 which is movable between limit switches 152 and 153. A two-way hydraulic valve 154 is operated by a lever 155 having roller connection with the lever 150. The hydraulic system for operating the brake comprises a hydraulic pump 156, which produces hydraulic pressure in an accumulator 157 and through a line 158 controlled by the valve 154 feeds the hydraulic brake expanding members 74 and 75. When the valve is turned the opposite way the fluid from the brake returns through a line 159 to a reservoir 160 which supplies fluid to the pump 156.

Figure 24:
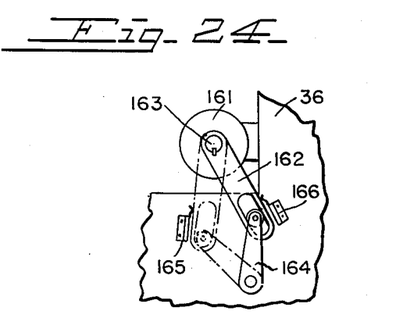
FIG. 24 is a detail view of the throttle control.

The throttles (see FIG. 24) are controlled by low speed geared high-torque electric motors 161, mounted on the engine 36. An arm 162 fixed to the motor shaft 163 has roller connection with an arm 164 for advancing or retarding the throttle. Limit switches 165 and 166 contacted by the arm 162 limit the movement of the arm 162.

CIRCUIT DESCRIPTION OF REMOTE CONTROL

Transmitter. (See FIG. 25)

Figure 25:
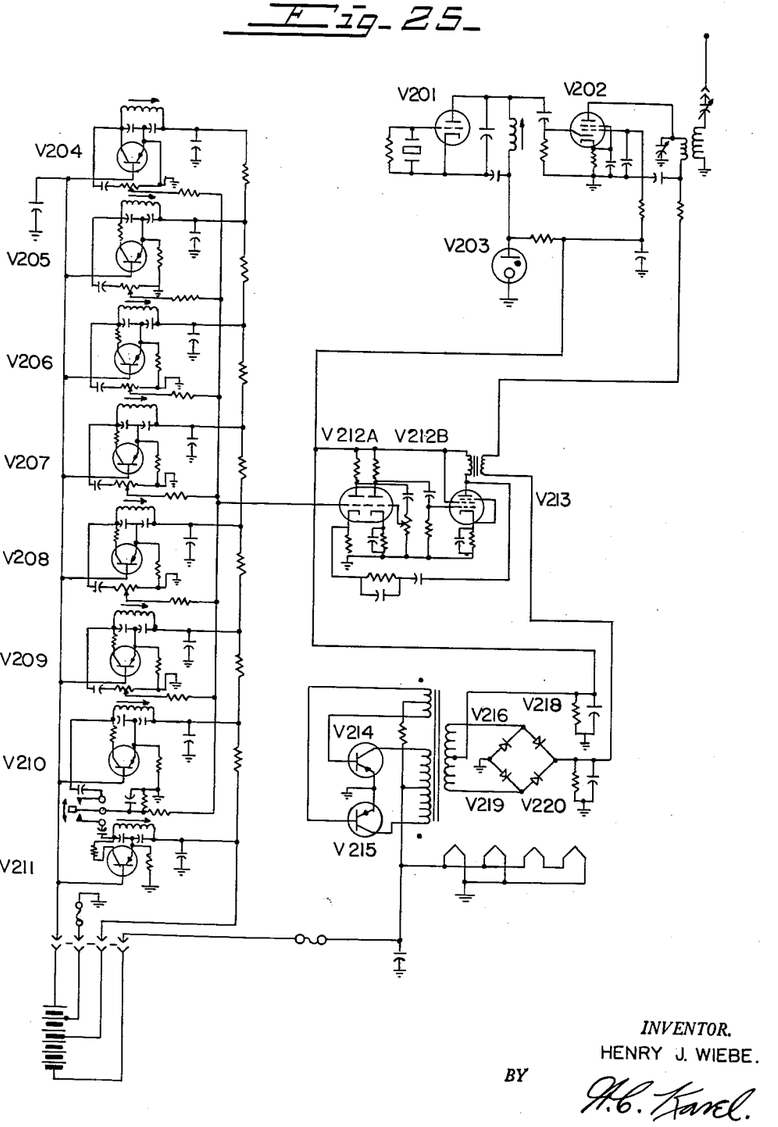
FIG. 25 is a wiring diagram of the transmitter.

V201 functions as a crystal oscillator with its plate tank tuned to the third overtone (27 mc.). V202 is capacitively driven by V201, and its functions as a power amplifier. A quarter-wave whip antenna is inductively coupled to the output tank with an impedance matching series tuned circuit.

V204, V205, V206, V207, V208 and V209 are L-C oscillators operating at a fixed frequency. Each frequency is a sub-carrier for the No. 1 throttle, No. 2 throttle, No. 1 brake, No. 2 brake, No. 1 transmission, and No. 2 transmission. The operator controls each oscillator output through the levers on the transmitter 131, to control the corresponding function. The outputs are mixed through resistors.

V210 and V211 are identical, V210 is an oscillator that differs only in frequency from those described above. It provides a sub-carrier for raising the central structural chassis. V211 is another similar oscillator that provides a sub-carrier for lowering the central structural chassis controlling the motors 114 on chassis No. 1 and No. 2.

Output from either V210 or V211 is selected by a center off switch controlled by the lever 140 on the transmitter 131, and is then fed to the modulator.

The composite output of the resistive mixers consists of a variable amount of the six frequencies, and either one of the other two, on switch command. This output is fed to the grid of V212A. By virtue of negative feedback to its cathode, V212A has fairly high input impedance. Its output goes to V212B through a gain control (used to set modulation to approximately 80%). V212B drives V213, a modulator. The secondary of the modulation transformer is in series with V202's B+ to amplitude modulate the RF carrier with all eight sub-carriers.

In the power supply, a wet-battery powers a transistor switching inverter (V214 and V215). The stepped up square-wave voltage is rectified by a silicon rectifier bridge (V216, V218, V219 and V220). Full B+ goes to V202's plate, and half of B+ voltage goes to the rest of the circuit. V201's plate voltage is stabilized by V203, against B+ drops due to battery voltage variations. The battery also supplies collector voltage and base bias for the eight sub-carrier oscillators.

Receivers. (See FIG. 26)

Figure 26:
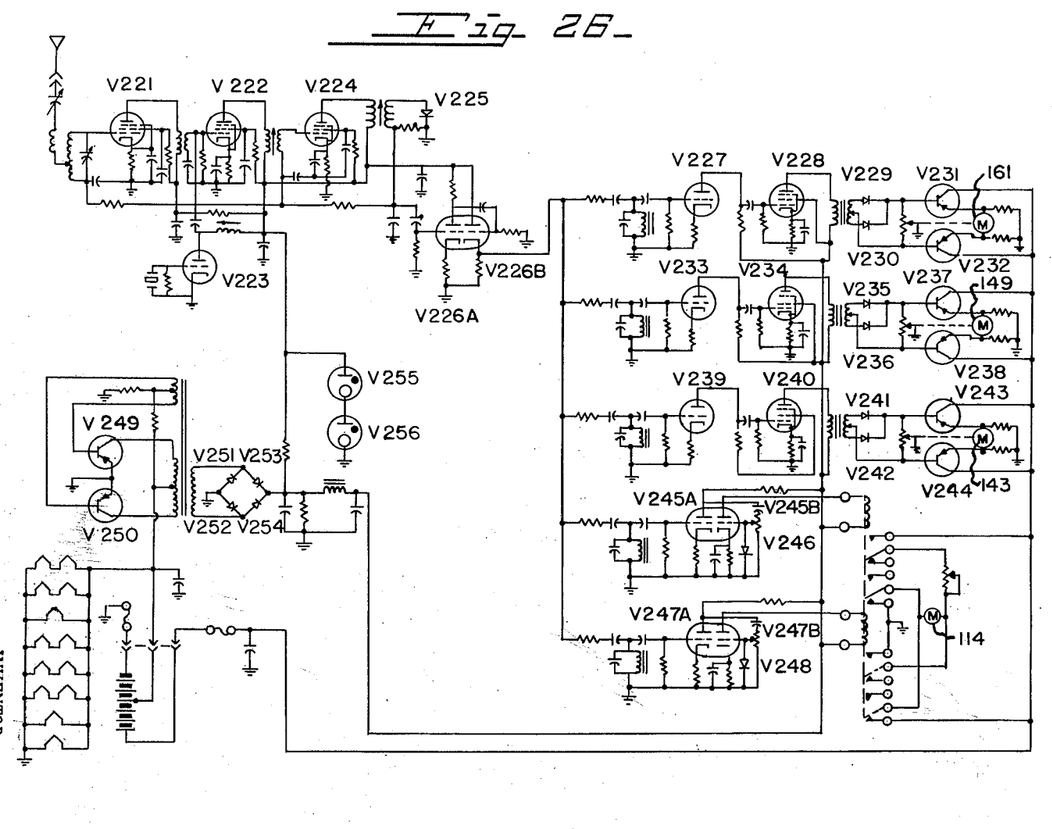
FIG. 26 is a wiring diagram of the receiver.

The receiver 132 is mounted on the No. 1 chassis and the receiver 133 is mounted on the No. 2 chassis. These receivers are identical except for certain values. Therefore one receiver circuit is shown and described and the second receiver is identical except for certain values.

V221 receives the signal and functions as an RF amplifier. It feeds V222, the mixer. V223 is a crystal controlled local oscillator (third overtone). V224 is an IF amplifier, driving V225, the detector. AVC reduces fading effects (RF and IF amplifier are controlled). The audio output goes to V226A, an AF amplifier with cathode degeneration. This tube feeds a cathode follower, V226B. The only difference in receiver No. 1 and receiver No. 2 is that No. 1 receiver has channels tuned to No. 1 throttle, brake and transmission, while No. 2 receiver tunes to No. 2 sub-carriers.

The carrier sent out by the transmitter is amplitude modulated at the transmitter by a composite signal consisting of: throttle No. 1, brake No. 1, transmission No. 1, throttle No. 2, brake No. 2, transmission No. 2, central chassis raise and central chassis lower sub-carriers. The following description describes the No. 1 receiver and the No. 2 receiver is similar except for certain values. The RF section consists of V221, V222, V223, V224, V225, V226A and V226B.

The carrier, modulated by the composite signal, from the transmitter is received by the antenna of receiver 132 which is the No. 1 receiver. This signal is amplified by RF amplifier V221, and then is mixed with the local oscillator signal from local oscillator V223 in mixer V222. The IF signal is sent to IF amplifier V224, then to detector V225 which provides automatic gain control as well as the detected composite signal. This composite signal is amplified by signal amplifier V226A and then isolated by cathode follower V226B.

The following tubes control the throttle: V227, V228, V229, V230, V231, V232. From the cathode of V226B, a selective filter passes only the throttle sub-carrier to sub-carrier amplifier V227. The output of this amplifier drives power amplifier V228. Its output is rectified by V229 and V230 to convert the sub-carrier amplitude variations representing variations for throttle control settings, into D.C. amplitude variations. This D.C. provides a reference input for motor driver V231 and motor driver V232. The geared down motor 161 driven by these drivers controls the throttle linkage shown in FIG. 24 on the No. 1 engine, as well as turning a potentiometer to nullify the D.C. input to the drivers when the motor approaches the desired setting. This same arrangement is on the No. 2 engine except that certain values are different.

The following tubes control the brake operating mechanism: V233, V234, V235, V236, V237 and V238. From the cathode of V226, a selective filter passes only the brake sub-carrier to sub-carrier amplifier V233. The output of this amplifier drives power amplifier V234. Its output is rectified by V235 and V236 to convert the sub-carrier amplitude variations, representing variations in brake control settings into D.C. amplitude variations. This D.C. provides a reference input for motor driver V237 and motor driver V238. The geared down motor 149 driven by these drivers actuates the hydraulic valve 154 going to the brake on the wheel 66, as well as turning a potentiometer to nullify the D.C. input to these drivers when the motor approaches the desired setting.

The following tubes control the transmission: V239, V240, V241, V242, V243 and V244. From the cathode V226B, a selective filter passes only the transmission sub-carried to sub-carrier amplifier V239. The output of this amplifier drives power amplifier V240. Its output is rectified by V241 and V242 to convert the sub-carrier amplitude variations, representing variations in transmission range selector settings, into D.C. amplitude variations. This D.C. provides a reference input for motor driver V243 and motor driver V244. The geared down motor 143 driven by these drivers actuates the selector on the transmission on the No. 1 engine chassis, as well as turning a potentiometer to nullify the D.C. input to these drivers when the motor approaches the desired setting.

Tubes V245 and V246 control the raising of the central chassis 33. From the cathode of V226B, a selective filter passes only the "raise" sub-carrier to rectifier V246 and relay amplifier V245. The relay connections are necessary to run the lifting screw motor clockwise when the relay is pulled in by the presence of the "raise" sub-carrier.

Tubes V247 and V248 control the lowering of the central chassis 33. From the cathode of V226B, a selective filter passes only the "lower" sub-carrier to rectifier V248 and relay amplifier V247. The relay connections are necessary to run the lifting screw motor 114 counter-clockwise when the relay is pulled in by the presence of the "lower" sub-carrier.

The components of the power supply are V249, V250, V251, V252, V253, V254, V255 and V256. Power inverter V249 and power inverter V250 step up the storage battery voltage to high voltage A.C. which is rectified by V251, V252, V253 and V254. B+ to the critical RF stages is regulated by V255 and V256.

In both receivers the raising and lowering circuiting for the central chassis is identical and both the motors 114 are actuated in unison.

OPERATION

The vehicle is designed for operation by a single operator. The No. 1 and No. 2 chassis are positioned end to end with the central chassis for driving the vehicle when disengaged from the airplane. This is known as the vehicle driving configuration. In this arrangement the operator is sitting facing forward with the No. 1 engine to his rear and he has the transmitter 131 in a position for easy operation. This control unit uses a self-contained transmitter sending signals to each of two receivers on the vehicle. The operator controls the two throttles, the two brakes, and the two transmissions, one for each engine, by changing the signals transmitted by the controller, and received by the independent receivers and associated actuators. The cam lever 110 is positioned as shown in FIG. 16 for placing the sprocket wheel 109 in mesh with the chain 108. The motor 101 is a reversible motor and by means of a suitable switch 169 near the driver's seat, the pilot wheel can be turned in one direction or the other to steer the vehicle. In this configuration only the No. 1 engine is operated and through the transmitter 131, the operator controls the direction of travel, the throttle setting and the brake application. In this configuration the vehicle can be driven to any location.

When it is desired to move an airplane, the vehicle is driven to a location near the rear of the airplane in the configuration as described above. The pull pins 123 are pulled to release the alignment position of No. 1 and No. 2 chassis from the central chassis. The pilot wheel on the No. 1 chassis is turned to rotate the No. 1 chassis as the vehicle's No. 1 engine is driven to cause the No. 1 chassis to assume a position at right angles to the central chassis, and the pull pin 123 is engaged with the aperature 125 in the No. 1 frame. Continued movement of the No. 1 chassis in the same direction will cause the central chassis to move around the driving wheel of the No. 2 chassis until it is at right angles to the No. 2 chassis. The pull pin 123 is then engaged to lock this chassis in position at right angles to the central chassis.

Figure 6:
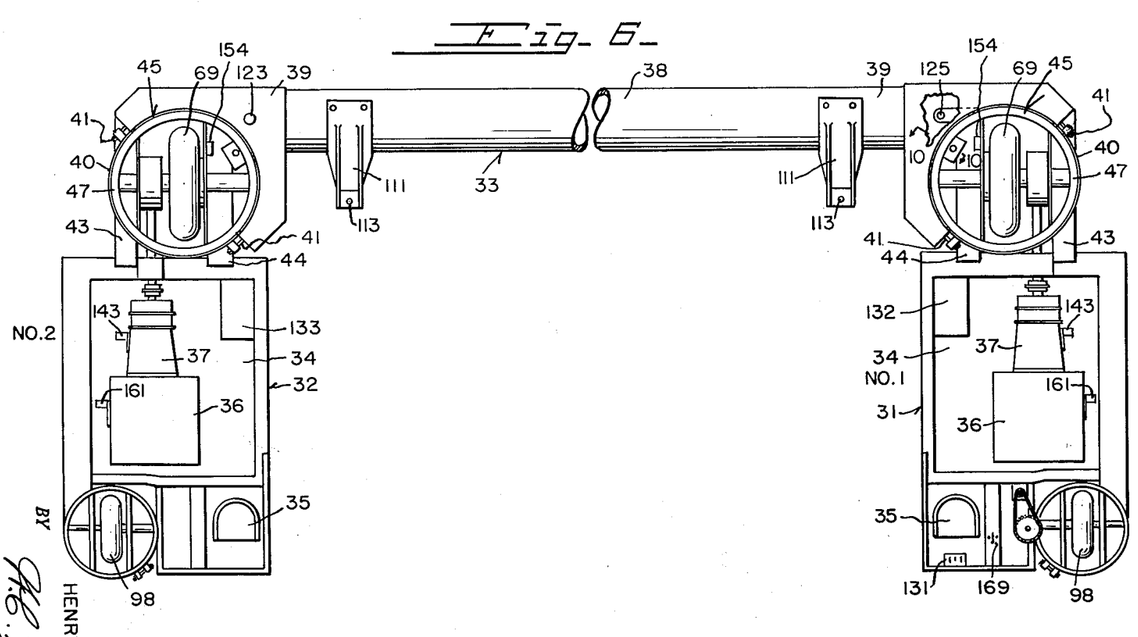
FIG. 6 is a plan view of the vehicle in an arrangement for attachment to an airplane.

The vehicle is now in position as shown in FIG. 6, the airplane taxiing configuration. The sprocket wheel 109 is disengaged from the chain 108 by rotating the eccentric 106 by means of the lever 110 to place both pilot wheels in castering position. Both engines are now started to drive the driving wheels 66 and by manipulating the respective throttles, and controlling at the same time the brake action on both drive wheels with the left hand and right hand brake levers respectively on the operators console, the vehicle can be eased into position whereby the jack point members 113 are under the jack points recesses 170 on the main landing gears of the airplane.

The lever 140 on the transmitter is moved to "raise" position, which causes a signal to be sent to the two receivers 132 and 133 energizing the motors 114 for rotating the sprockets 122 meshing with the chain 120 for causing the drum 51 to rotate in a direction to cause the sleeve 42 to rise on the ball race until a portion of the weight of the airplane is imposed on the central chassis. The operator can now by manipulation of the two engines maneuver the airplane in any direction either forward, rearward, turning it around on its own center on a zero turning radius, moving it regardless of the condition of the terrain on which it rests, and taxiing the airplane safely at maximum allowable taxi speeds.

While I have shown the two power chassis capable of being positioned either in end to end position or in positions at right angles to the central chassis and forward thereof, it will be apparent that the two power chassis could be turned to extend rearwardly from the central chassis if desired.

With the remote control unit, the operator can control throttles, brakes and transmission of both engine units from anywhere in the vicinity of the airplane. He can control from a seat at either engine unit, or he can see any part of the airplane while controlling both unts, simply by taking the completely self-contained master control unit with him. This feature makes "close-quarters" maneuvering of large aircraft easier than ever before. One man can quickly and easily move an aircraft into hangers, around other parked aircraft, and in other "tight spots" formerly requiring a man on each wingtip and tail to signal the vehicle driver. All this can be accomplished with ease by using the master control unit.

The throttle levers can be set by the operator to any desired setting between idle and full throttle. It is similar in appearance to the aircraft's own throttle levers. There are two throttles, one for each engine.

The brakes can be applied to both drive wheels with two levers on the master control unit. Each lever is normally spring-loaded to return to "off" position, but they can be locked "on" with a simple built-in lock that can be easily released. Designed to give good "feel" to the operator, the differential braking greatly simplifies turning and maneuvering.

The two transmissions may be placed into any desired range, or into "neutral" by detent-type levers on the master control unit that clearly indicate the range each transmission is in; reverse, neutral, first, second or third.

These controls are mounted on the lightweight, portable console 131 that may be slung around the operator's neck to free his hand for control. A small built-in transmitter sends control signals to the two receivers 132 and 133 on the vehicle, thus eliminating complex control cables and wires. The transmitter operates for hours from a built-in battery that is automatically re-charged when it is mounted on the vehicle.

These features combine to give the operator more accurate control over the hitherto unmanageable and unmoveable heavy airplane. Coupled with the vehicle's high performance capabilities, this diversified master control unit will provide complete control of the ground movement of the airplane.

Having thus fully described my invention, what I claim as new and desire to secure by Letters Patent is:

1. In a twin-drive ground mover and retriever vehicle for airplanes comprising a central chassis and a pair of power chassis, each power chassis having a prime mover mounted thereon, a vertical sleeve on the end of each power chassis, a drive wheel mounted within each vertical sleeve, second sleeves rotatable on said power chassis about said vertical sleeves, means for rotating said second sleeves, said central chassis having ends fixed to third sleeves about said rotatable sleeves, and spiral tracks in said second and third sleeves forming mating raceways for ball operated screws for raising or lowering the third sleeves and central chassis relative to the two power chassis.

2. In a twin-drive ground mover and retriever vehicle for airplanes comprising a central chassis and a pair of power chassis, each power chassis having a prime mover mounted thereon, a vertical sleeve on the end of each power chassis, a drive wheel mounted within each vertical sleeve, second sleeves rotatable on said power chassis about said vertical sleeves, means for rotating said second sleeves, said central chassis having ends fixed to third sleeves about said rotatable sleeves, spiral tracks in said second and third sleeves forming mating raceways for ball operated screws for raising and lowering the third sleeves and central chassis relative to the power chassis, and means for horizontally rotating said two power chassis relative to said central chassis.

3. In a twin-drive ground mover and retriever vehicle for airplanes comprising a central chassis and a pair of power chassis, each power chassis having a prime mover mounted thereon, a vertical sleeve on the end of each power chassis, a drive wheel mounted within each vertical sleeve, second sleeves rotatable on said power chassis about said vertical sleeves, means for rotating said second sleeves, said central chassis having ends fixed to third sleeves about said rotatable sleeves, spiral tracks in said second and third sleeves forming raceways for ball operated screws for raising and lowering the third sleeves and central chassis relative to the two power chassis, and a pilot wheel castering on each power chassis.

4. In a twin-drive ground mover and retriever vehicle for airplanes comprising a central chassis and a pair of power chassis, each power chassis having a prime mover mounted thereon, a vertical sleeve on the end of each power chassis, a drive wheel mounted within each vertical sleeve, second sleeves rotatable on said power chassis about said vertical sleeves, means for rotating said second sleeves, said central chassis having ends fixed to third sleeves about said rotatable sleeves, spiral tracks in said second and third sleeves forming mating raceways for ball operated screws for raising and lowering the third sleeves and central chassis relative to the power chassis, means for horizontally rotating said two power chassis relative to said central chassis, and a pilot wheel on each power chassis.

5. In a twin-drive ground mover and retriever vehicle for airplanes comprising a central chassis and a pair of power chassis, each power chassis having a prime mover mounted thereon, a vertical sleeve on the end of each power chassis, a drive wheel mounted within each vertical sleeve, second sleeves rotatable on said power chassis about said vertical sleeves, means for rotating said second sleeves, said central chassis having ends fixed to third sleeves about said rotatable sleeves, spiral tracks in said second and third sleeves forming raceways for ball operated screws for raising and lowering the third sleeves and central chassis relative to the two power chassis, a pilot wheel castering on each power chassis, and means for engaging or disengaging a steering mechanism with one of said pilot wheels.

6. In a twin-drive ground mover and retriever vehicle for airplanes comprising a central chassis and a pair of power chassis, each power chassis having a prime mover mounted thereon, a vertical sleeve on the end of each power chassis, a drive wheel driven by said prime mover mounted within each vertical sleeve, second sleeves rotatable on said power chassis about said vertical sleeves, means for rotating said second sleeves, said central chassis having ends fixed to third sleeves about said rotatable sleeves, spiral tracks in said second and third sleeves forming raceways for ball operated screws for raising and lowering the third sleeves and central chassis relative to the two power chassis, a pilot wheel castering on each power chassis, means for engaging and disengaging a steering mechanism with one of said pilot wheels, and means on said central chassis for engagement with the landing gear of an airplane.

References Cited in the file of this patent

UNITED STATES PATENTS

| | | |
|---|---|---|
| 2,391,503 | Page | Dec. 25, 1945 |
| 2,653,827 | Manning | Sept. 29, 1953 |
| 2,772,892 | Hake et al. | Dec. 4, 1956 |
| 2,776,146 | Marino | Jan. 1, 1957 |
| 2,798,729 | Paul | July 9, 1957 |
| 2,846,018 | Puckett | Aug. 5, 1958 |
| 2,883,774 | Clifford | Apr. 28, 1959 |
| 2,957,650 | Horan et al. | Oct. 25, 1960 |